United States Patent
Fujiuchi et al.

(10) Patent No.: US 9,329,333 B2
(45) Date of Patent: May 3, 2016

(54) IRRADIATION DEVICE AND IMAGE-READING DEVICE

(71) Applicants: Akiko Fujiuchi, Tokyo (JP); Toshiaki Shoji, Tokyo (JP); Nobutaka Kobayashi, Tokyo (JP); Akio Masuda, Tokyo (JP)

(72) Inventors: Akiko Fujiuchi, Tokyo (JP); Toshiaki Shoji, Tokyo (JP); Nobutaka Kobayashi, Tokyo (JP); Akio Masuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/371,079

(22) PCT Filed: Dec. 3, 2012

(86) PCT No.: PCT/JP2012/081258
§ 371 (c)(1),
(2) Date: Jul. 8, 2014

(87) PCT Pub. No.: WO2013/114720
PCT Pub. Date: Aug. 8, 2013

(65) Prior Publication Data
US 2014/0355078 A1 Dec. 4, 2014

(30) Foreign Application Priority Data
Jan. 30, 2012 (JP) ................... 2012-016130

(51) Int. Cl.
*H04N 1/04* (2006.01)
*F21V 8/00* (2006.01)
(Continued)

(52) U.S. Cl.
CPC ............ *G02B 6/0096* (2013.01); *G02B 5/0231* (2013.01); *G02B 5/0284* (2013.01);
(Continued)

(58) Field of Classification Search
CPC .......... H04N 1/02815; H04N 1/02835; H04N 1/028; H04N 1/193; H04N 1/02885
See application file for complete search history.

(56) References Cited

U.S. PATENT DOCUMENTS 6,232,592 B1 * 5/2001 Sugiyama ................ 250/227.11
6,236,470 B1 * 5/2001 Seachman ..................... 358/471
(Continued)

FOREIGN PATENT DOCUMENTS

JP   10 133026    5/1998
JP   2001 148767  5/2001
(Continued)

OTHER PUBLICATIONS

International Search Report Issued Mar. 5, 2013 in PCT/JP12/081258, filed Dec. 3, 2012.
(Continued)

*Primary Examiner* — Cheukfan Lee
(74) *Attorney, Agent, or Firm* — Oblon, McClelland, Maier & Neustadt, L.L.P

(57) ABSTRACT

An irradiation device increasing the lighting depth and facilitating the assembling is provided. A transparent bar-shaped light guide having LEDs disposed near ends thereof includes a first prism group and a first reflector, and, a second prism group and a reflector which are provided so as to extend in a lengthwise direction and which diffuse and reflect light. The light guide includes a first light outgoing area emitting reflected light as primary light Lm, and a second light outgoing area emitting reflected light as secondary light Ls. The first light outgoing area includes a plane portion forming a flat surface. A plane mirror reflects the secondary light Ls in a direction overlapping the primary light Lm in a read area.

15 Claims, 13 Drawing Sheets

(51) Int. Cl.
*H04N 1/028* (2006.01)
*G02B 6/42* (2006.01)
*G02B 5/02* (2006.01)
*F21Y 101/02* (2006.01)

(52) U.S. Cl.
CPC ............ *G02B 6/001* (2013.01); *G02B 6/4204* (2013.01); *G02B 6/4298* (2013.01); *H04N 1/0289* (2013.01); *H04N 1/02815* (2013.01); *H04N 1/02825* (2013.01); *H04N 1/02835* (2013.01); *F21Y 2101/02* (2013.01); *G02B 6/0085* (2013.01)

(56) References Cited

U.S. PATENT DOCUMENTS

| | | | |
|---|---|---|---|
| 6,268,600 B1 * | 7/2001 | Nakamura et al. | 250/216 |
| 6,728,010 B1 * | 4/2004 | Tsutsumi | 358/475 |
| 6,999,210 B2 * | 2/2006 | Uchida | 358/475 |
| 7,538,911 B2 * | 5/2009 | Sakurai et al. | 358/475 |
| 7,978,379 B2 * | 7/2011 | Fujiuchi et al. | 358/475 |
| 8,167,475 B2 * | 5/2012 | Katsumata et al. | 362/610 |
| 8,194,294 B2 * | 6/2012 | Tagawa et al. | 358/475 |
| 8,625,170 B2 * | 1/2014 | Imoto et al. | 358/474 |
| 8,913,307 B2 * | 12/2014 | Sugiyama | 358/484 |
| 9,172,836 B2 * | 10/2015 | Kelsay | H04N 1/02815 |
| 2005/0030180 A1 * | 2/2005 | Pantus et al. | 340/556 |
| 2008/0212148 A1 | 9/2008 | Fujiuchi et al. | |
| 2009/0003784 A1 * | 1/2009 | Kabuki et al. | 385/119 |
| 2009/0027915 A1 * | 1/2009 | Kaneko | 362/555 |
| 2010/0012852 A1 * | 1/2010 | Higashitani et al. | 250/458.1 |
| 2010/0014315 A1 * | 1/2010 | Fujimoto | 362/615 |
| 2010/0103681 A1 * | 4/2010 | Kamei et al. | 362/298 |
| 2010/0265551 A1 * | 10/2010 | Endoh | 358/474 |
| 2011/0058366 A1 * | 3/2011 | Lin et al. | 362/217.05 |
| 2011/0102862 A1 * | 5/2011 | Inoue et al. | 358/474 |
| 2011/0149590 A1 | 6/2011 | Kamei et al. | |
| 2011/0216541 A1 * | 9/2011 | Inoue et al. | 362/296.09 |
| 2012/0206779 A1 * | 8/2012 | Suto et al. | 358/475 |
| 2014/0268254 A1 * | 9/2014 | Iwamatsu et al. | 358/475 |
| 2014/0347884 A1 * | 11/2014 | Fujiuchi et al. | 362/609 |
| 2014/0355290 A1 * | 12/2014 | Ouchi | 362/551 |
| 2014/0355291 A1 * | 12/2014 | Okamoto | 362/551 |
| 2014/0355296 A1 * | 12/2014 | Shigoku | 362/558 |
| 2014/0355303 A1 * | 12/2014 | Fujiuchi et al. | 362/611 |

FOREIGN PATENT DOCUMENTS

| | | |
|---|---|---|
| JP | 2003 346509 | 12/2003 |
| JP | 2008 216409 | 9/2008 |
| JP | 2008 219244 | 9/2008 |
| JP | 2011 147105 | 7/2011 |
| JP | 2011 186499 | 9/2011 |

OTHER PUBLICATIONS

Office Action issued Oct. 6, 2015 in Japanese Patent Application No. 2012-016130 (with English language translation).

* cited by examiner

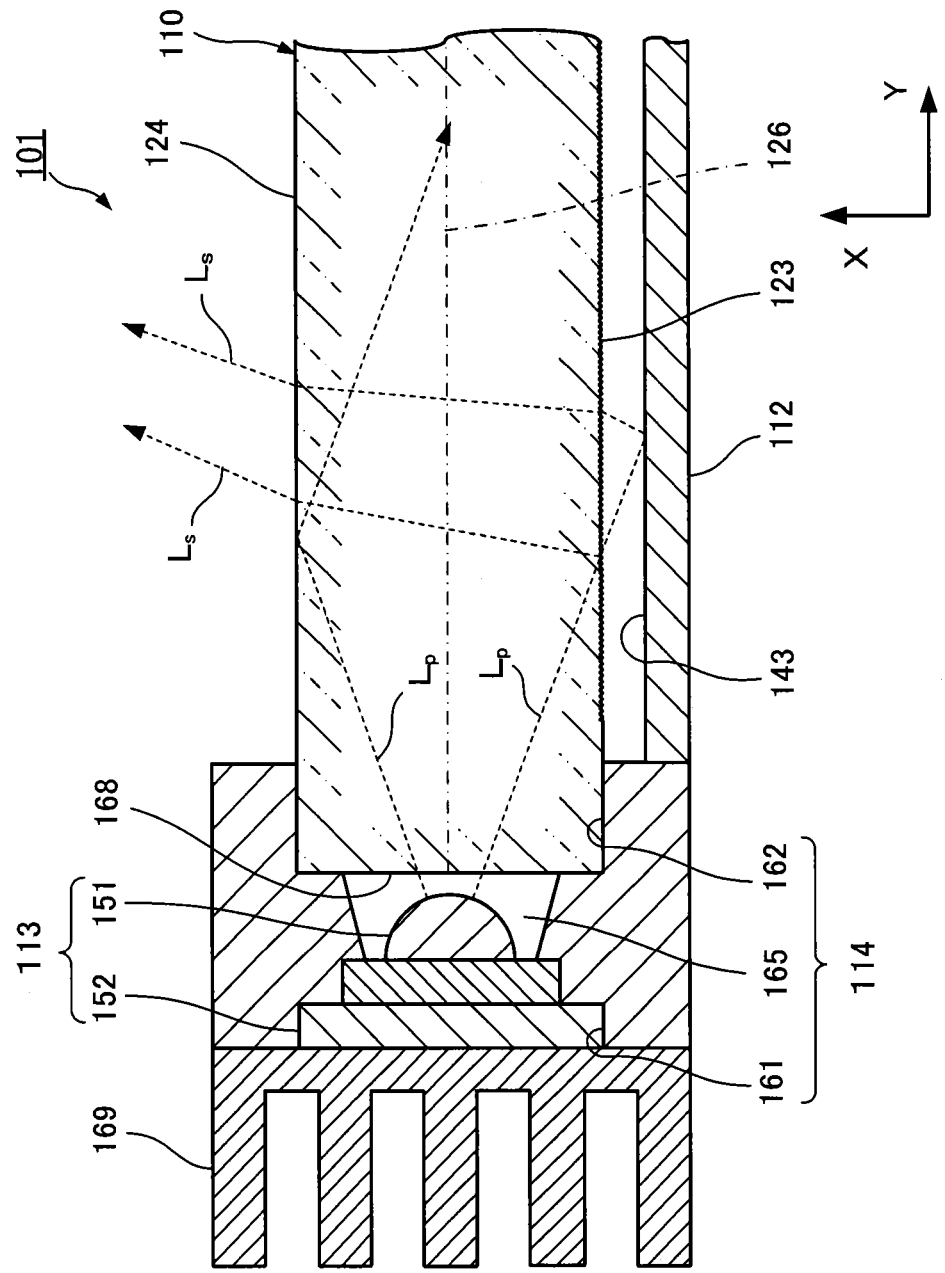

IRRADIATION DEVICE AND IMAGE-READING DEVICE

TECHNICAL FIELD

The present invention relates to an irradiation device and an image-reading device.

BACKGROUND ART

Image-reading devices cause an irradiation device to emit light to a document, receive reflected light of emitted light from the document, and generate image data containing information represented on the document. As light sources of the emitted light, xenon lamps and halogen lamps are widely used, but in recent years, in accordance with the tendency of energy saving, those lamps are being replaced with light emitting diodes (LED: Light Emitting Diode) (see, for example, Patent Literatures 1 and 2).

In general, a folding line and a wrinkle of a document, and a nearby portion to the opened portion between pages when the document is a book sometimes appear as shadows in an image represented by image data generated by image-reading devices. The image sensor disclosed in Patent Literature 1 and the bifurcation linear light source device disclosed in Patent Literature 2 emit illumination light to a document in various directions in order to suppress a generation of such shadow.

The image sensor disclosed in Patent Literature 1 includes a bar-shaped light guide that propagates light from LEDs disposed at an end. The light guide includes first and second light scattering layers that cause propagated light scattered and reflected, a first light outgoing area that emits scattered and reflected light in the first light scattering layer, and a second light outgoing area that emits scattered and reflected light in the second light scattering layer. Light (primary light) emitted from the first light outgoing area is directly emitted to an irradiation portion of a document in an oblique direction. Light (secondary light) emitted from the second light outgoing area is reflected by a reflector, and is emitted to the irradiation portion of the document in an oblique direction. The secondary light is emitted to the irradiation portion of the document from the opposite side to the primary light relative to a lens that converges light reflected from the irradiation portion of the document.

According to the image sensor disclosed in Patent Literature 1, in order to balance the luminous radiance between the primary light and the secondary light so as to suppress a generation of shadows due to a folding line and a wrinkle, the second light scattering layer is wider than the first light scattering layer.

According to the bifurcation linear light source disclosed in Patent Literature 2, a reflection mirror (reflector) has a cross-sectional area in an oval shape or in a radial shape as viewed from the lengthwise direction of the light guide. Accordingly, the widespread width of light (secondary light) reflected by the reflection mirror and emitted to a reading face of a document becomes substantially same as that of light (primary light) directly emitted to the reading face of the document.

In addition, Patent Literature 3 discloses a shading correction method of emitting direct light from a light source and reflected light through a reflector member in opposing oblique directions to a document, thereby adjusting the illuminance distribution in a sub scanning direction when the light source is mainly xenon lamps.

CITATION LIST

Patent Literature

Patent Literature 1: Unexamined Japanese Patent Application Kokai Publication No. 2008-219244
Patent Literature 2: Unexamined Japanese Patent Application Kokai Publication No. 2008-216409
Patent Literature 3: Unexamined Japanese Patent Application Kokai Publication No. 2001-148767

SUMMARY OF INVENTION

Technical Problem

According to the image sensor disclosed in Patent Literature 1, the widespread width of the primary light and that of the secondary light in a paper feeding direction and in the irradiation portion of the document differ from each other, but both primary light and secondary light are emitted to the irradiation portion of the document in oblique directions. In this case, when a distance of the document from the image sensor in an optical-axis direction of the lens changes, the illuminance in the irradiation portion of the document may change in accordance with such a distance. Hence, a portion of the document that is difficult to be disposed while maintaining a predetermined distance from the image sensor like the open portion between pages of a book may have a changing contrast density in an image represented by generated image data.

According to the bifurcation linear light source disclosed in Patent Literature 2 or 3, the reflection mirror having an oval or radial cross-sectional area is employed. It is necessary to highly precisely position such a reflector mirror in the bifurcation linear light source, making the assembling of the bifurcation linear light source device difficult.

The present disclosure has been made in view of the aforementioned circumstances, and it is an objective of the present disclosure to provide an irradiation device and the like which can increase the lighting depth and which can be easily assembled.

Solution to Problem

To accomplish the above objective, an irradiation device of the present disclosure includes a light source that emits light, a transparent bar-shaped light guide having the light source disposed near the end thereof, a first diffusion/reflection portion which is provided so as to extend in the lengthwise direction of the light guide, and which diffuses and reflects light propagating the interior of the light guide, a first light outgoing area which is a portion of the outer surface of the light guide in the reflection direction of the first diffusion/reflection portion, extends in the lengthwise direction, and emits, as primary light, the reflected light by the first diffusion/reflection portion, a second diffusion/reflection portion which is provided so as to extend in the lengthwise direction of the light guide, and which diffuses and reflects light propagating the interior of the light guide, a second light outgoing area which is a portion of the outer surface of the light guide in the reflection direction of the second diffusion/reflection portion, extends in the lengthwise direction, and emits, as secondary light, the reflected light by the second diffusion/reflection portion, and a plane mirror that reflects the secondary light in a direction overlapping the primary light in a predetermined area. The second light outgoing area has a curvature as viewed in the lengthwise direction of the light guide. The first light outgoing area at least partially includes a plane or a curved face with a smaller curvature than that of the second light outgoing area as viewed in the lengthwise direction, and the primary light has a wider divergence angle than that of secondary light.

Advantageous Effects of Invention

According to the present disclosure, the first light outgoing area includes a curved face or a plane having a smaller curvature than that of the second light outgoing area, and thus primary light can have a wider divergence angle than that of secondary light. Hence, the lighting depth can be increased. In addition, the mirror that reflects the secondary light is a plane mirror, and thus assembling is easy.

BRIEF DESCRIPTION OF DRAWINGS

FIG. 5 is a cross-sectional view taken along a line II-II in FIG. 2;

DESCRIPTION OF EMBODIMENTS

Figure 1:
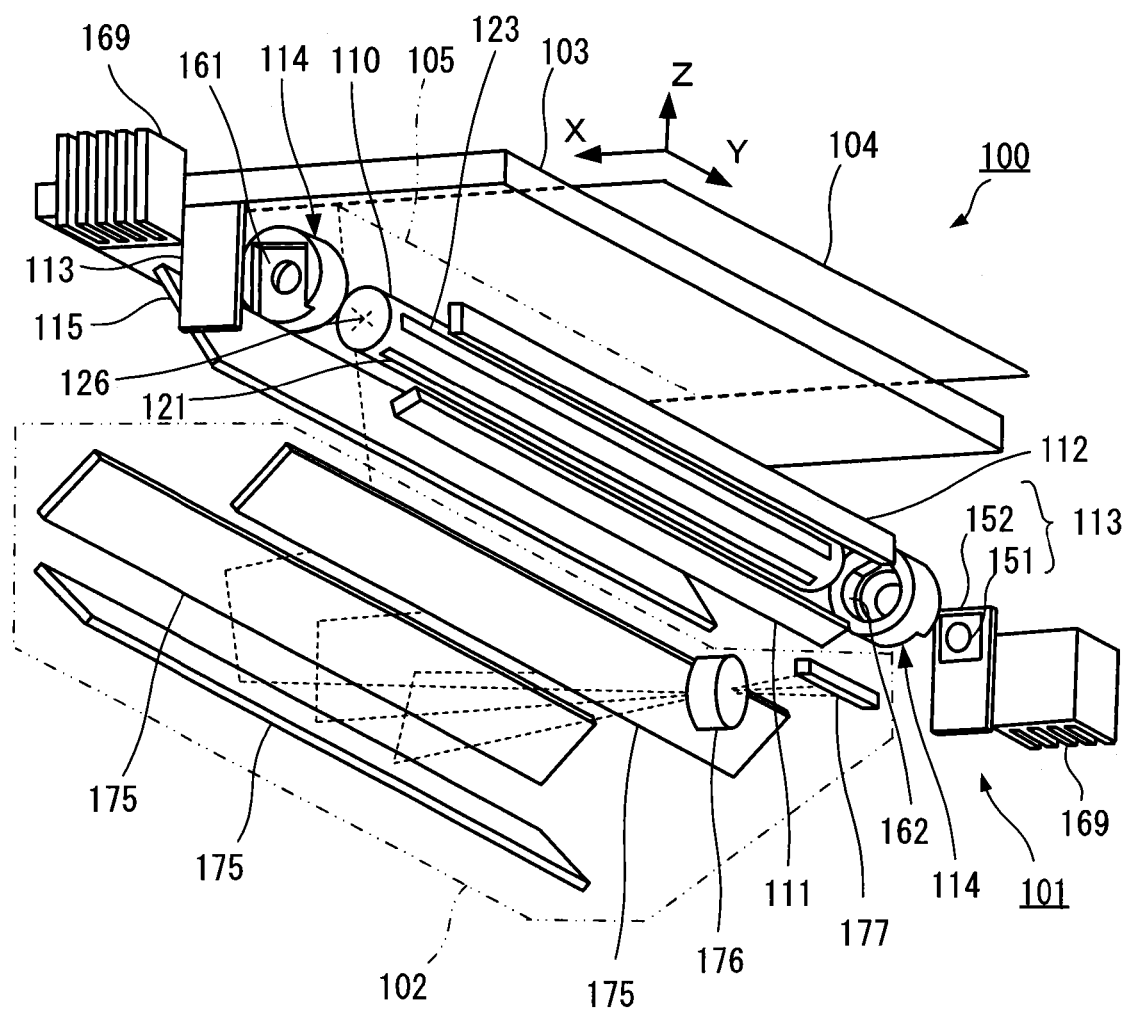
FIG. 1 is a perspective view illustrating a structure of an image-reading device according to Embodiment 1 of the present disclosure.

Embodiments of the present disclosure will be explained with reference to the accompanying drawings. The same component will be denoted by the same reference numeral throughout the figures. The dimension/ratio of a component forming an image-reading device can be changed as needed, and is not limited to the illustrated example in each figure.

Embodiment 1

FIG. 1 is a perspective view illustrating a structure of an image-reading device according to Embodiment 1 of the present disclosure. The image-reading device 100 is a device that reads information, such as a letter, a pictorial figure, and a symbol indicated on one face (reading face) of a document 104 placed on a contact glass 103, and outputs image data containing read information. The document 104 is an example having information to be read by the image-reading device 100. The image-reading device 100 includes an irradiation device 101 and a reader device 102.

The irradiation device 101 is a device that emits light to a linear read area 105 in different two directions intersecting a leading line. The read area 105 can be defined accordingly as an area which can be irradiated with light at the optimized illuminance and illuminance distribution using the irradiation device 101. The irradiation device 101 includes a light guide 110, a first reflector 111, a second reflector 112, two light sources 113, two holders 114, and a plane mirror 115.

The light guide 110 is a transparent bar-shaped member formed of, for example, acrylic or cyclo-olefin-based transparent resin or glass. A lengthwise direction of the light guide 110 is defined as a lengthwise direction (hereinafter, "Y direction") of the irradiation device 101. The light guide 110 has a cross section (hereinafter, referred to as "cross section of light guide 110") in a substantially circular shape as viewed in the Y direction. More specifically, for example, as illustrated in the cross-sectional area of FIG. 2 illustrating the irradiation device 101 as viewed in the Y direction, portions of the circular arc are short-cut.

Figure 2:
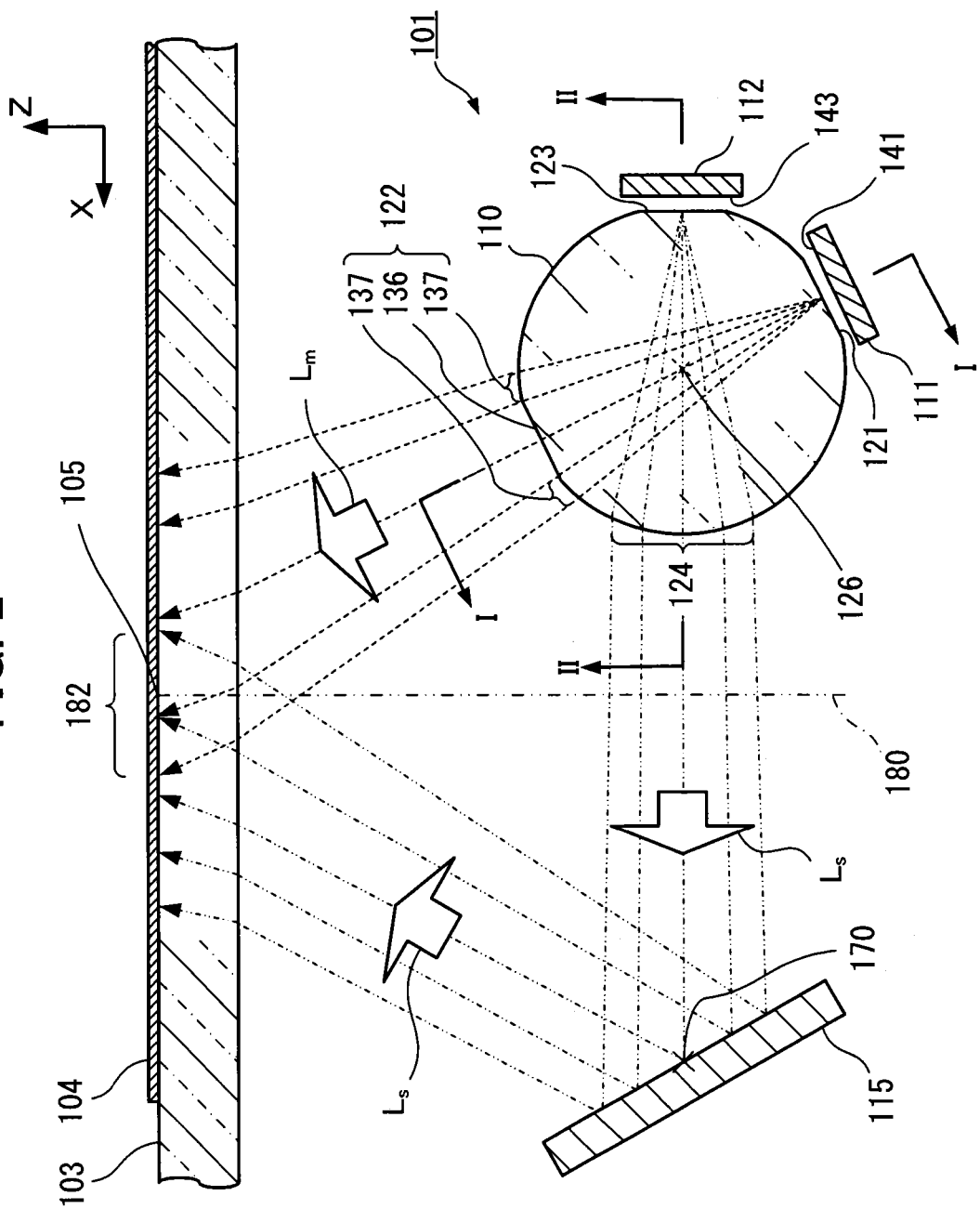
FIG. 2 is a cross-sectional view illustrating an irradiation device according to Embodiment 1 as viewed in a lengthwise direction of a light guide.

As illustrated in, for example, FIG. 2, the light guide 110 includes, on the external face thereof, a first prism group 121, a first light outgoing area 122, a second prism group 123, and a second light outgoing area 124. The first prism group 121 includes a large number of fine prisms, and forms an external face (external-side face) extending in the Y direction of the light guide 110.

Figure 3:
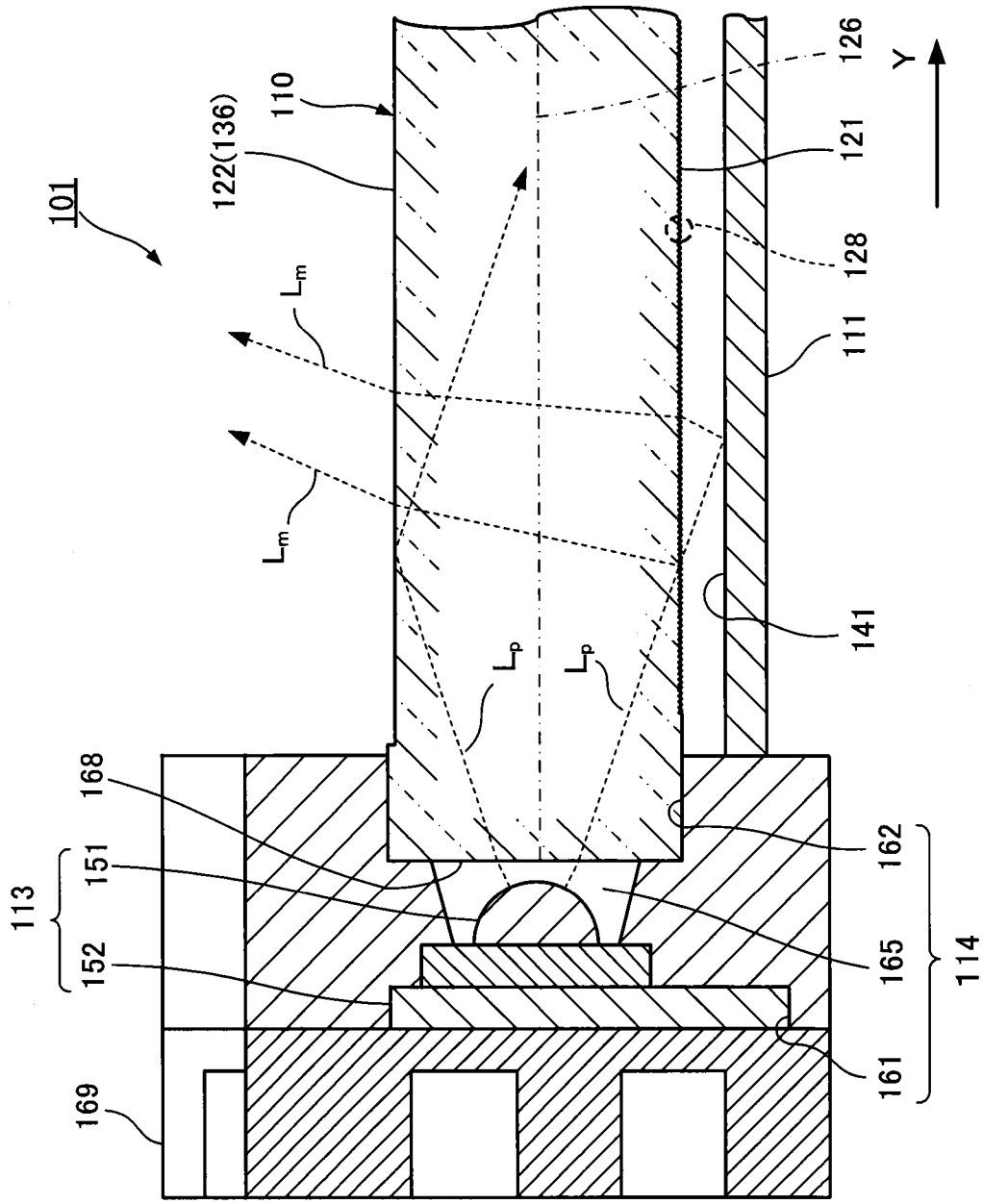
FIG. 3 is a cross-sectional view taken along a line I-I in FIG. 2.
Figure 4:
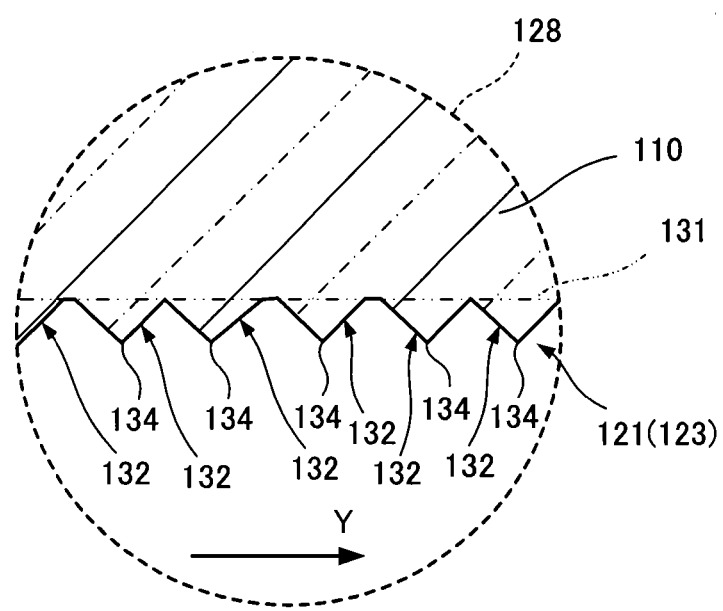
FIG. 4 is a diagram illustrating an area in FIG. 3 encircled by a dashed line in an enlarged manner.

FIG. 3 is a cross-sectional view illustrating a cross section taken along a line I-I in FIG. 2 as viewed in the direction of an arrow as a plane including the center of the first prism group 121 in a width direction vertical to the Y direction and a center axis (hereinafter, simply referred to as "axis") 126 of the light guide 110. As illustrated in FIG. 4 that illustrates an area 128 encircled by a dashed line in FIG. 3, each prism 132 of the first prism group 121 is in a chevron shape protruding from an area (first prism area) 131 forming a plane running as a stripe in the Y direction to a radial direction of the cross section of the light guide 110, and one thousand and several hundred to several thousand prisms are arranged side by side in the Y direction at irregular pitches. Each prism 132 of the first prism group 121 has a width of, for example, substantially 100 μm.

The ridge line 134 of each prism 132 of the first prism group 121 is, for example, vertical to the Y direction and is parallel with the first prism area 131.

As illustrated in FIGS. 2 and 3, the first light outgoing area 122 is a portion of the external face of the light guide 110 extending in the Y direction as a stripe, and is provided at a position substantially facing the first prism group 121 across an axis 126 of the light guide 110. The first light outgoing area 122 includes a plane portion 136 forming a parallel plane with the axis 126 of the light guide 110. The first light outgoing area 122 also includes, when viewed in the lengthwise direction as illustrated in FIG. 2, portions 137 of circumference (circumferential portions) shaping the general shape of the light guide 110 and connected to both ends of the plane portion 136.

The first light outgoing area 122 may have a curved face portion forming a curved face having a smaller curvature than 1/R when the radius of the circle that is the general shape of the cross section of the light guide 110 is R [m] instead of the plane portion 136. In addition, the first light outgoing area 122 may have no circumference portion 137.

The second prism group 123 includes a large number of fine prisms which form an external face of the light guide 110. As illustrated in FIG. 1, the second prism group 123 is provided between the first prism group 121 and the first light outgoing area 122 in the external face of the light guide 110. More specifically, for example, when viewed in the Y direction as illustrated in FIG. 2, the second prism group 123 is provided in, when the circle that is the general shape of the external face of the light guide 110 is divided into two semi circles by a diameter passing through the middle location between the first prism group 121 and the first light outgoing area 122, the semi circle at a side at which the first prism group 121 is provided.

FIG. 5 is a cross-sectional view taken along a line II-II in FIG. 2 and illustrating a cross section at a plane including the center of the second prism group 123 in a width direction vertical to the Y direction and the axis 126 of the light guide 110 as viewed in the direction of an arrow. The second prism group 123 includes, for example, like the first prism group 121, chevrons protruding from an area (second prism area) forming a plane extending in the Y direction as a stripe toward the radial direction of the cross section of the light guide 110, and one thousand and several hundred to several thousand prisms are arranged side by side in the Y direction at irregular pitches (see FIG. 4). Each prism 132 of the second prism group 123 has a width of, for example, substantially 100 μm.

The ridge line 134 of each prism 132 of the second prism group 123 is, for example, like the ones of the first prism group 121, vertical to the Y direction and is parallel with the second prism area.

As illustrated in FIGS. 2 and 5, the second light outgoing area 124 is formed at a portion that is a portion of the external face of the light guide 110 extending in the Y direction as a strip and substantially faces the second prism group 123 across the axis 126 of the light guide 110. The second light outgoing area 124 forms a portion of a circle that is the general shape of the light guide 110 as viewed in the lengthwise direction. That is, when the radius of the circle that is the general shape of the cross section of the light guide 110 is R [m], the second light outgoing area 124 has a curvature of 1/R.

As illustrated in FIG. 1, the first reflector 111 is a member extending in the Y direction as a stripe, and has one face that is a surface (first reflection surface) 141 reflecting light. It is desirable that the first reflection surface 141 should have a reflection rate of equal to or higher than 90% in order to increase the illuminance on the reading face of the document 104. Hence, the first reflection surface is a satin-finish surface (surface with texture) or a mirror surface.

The first reflector 111 is formed of, for example, a white resin like polycarbonate. The first reflector 111 may be formed by pasting a white tape on a structural member like a metal plate.

The first reflection surface 141 is formed in a stripe shape extending in the Y direction in accordance with the shape of the first reflector 111, and is disposed so as to be apart from the first prism group 121 by a predetermined distance and face therewith as illustrated in FIGS. 2 and 3. The first reflection surface 141 is wider than the first prism group 121, and is disposed so as to cover the whole first prism group 121. According to this embodiment, the first prism group 121 and the first reflector (reflector) 111 form a first diffusion/reflection area.

As illustrated in FIG. 1, the second reflector 112 is a member in a stripe shape extending in the Y direction, and has one surface that is a satin-finished surface or a mirror surface (second reflection surface) 143 reflecting light. It is desirable that the second reflection surface 143 should have a reflection rate of equal to or higher than 90% in order to increase the illuminance on the reading face of the document 104. Hence, the second reflection surface is formed as a satin-finished surface or a mirror surface.

The second reflector 112 is formed of, for example, a white resin like polycarbonate. The second reflector 112 may be formed by pasting a white tape on a structural member like a metal plate.

The second reflection surface 143 is formed in a stripe shape extending in the Y direction in accordance with the shape of the second reflector 112, and is disposed so as to be apart from the second prism group 123 by a predetermined distance and face therewith as illustrated in FIGS. 2 and 5. The second reflection surface 143 is wider than the second prism group 123, and is disposed so as to cover the whole second prism group 123. According to this embodiment, the second prism group 123 and the second reflector (reflector) 112 form a second diffusion/reflection area.

Each light source 113 includes, for example, as illustrated in FIG. 1, an LED (Light Emitting Diode) 151 that is a light source, and a substrate 152. The LED 151 is mounted on one surface of the substrate 152. The substrate 152 is formed of a material, such as a metal like aluminum, a resin like glass epoxy or polyimide, or ceramic. The substrate 152 is connected with a power cable (unillustrated) through a connector, and power to turn on the LED 151 is supplied therethrough.

The two holders 114 provided at both ends of the light guide 110 are, as illustrated in, for example, FIG. 1, members to hold the light guide 110 and the light source 113. Each holder 114 includes a light-source attachment 161 with which the light source 113 is attached, and an engagement portion 162 engaged with an end of the light guide 110. When the light source 113 is attached to the light-source attachment 161, the LED 151 is disposed in a light-source space 165 formed in the holder 114 (see FIGS. 3 and 5).

The engagement portion 162 is formed as a substantially circular hole slightly larger than a circle that is a general shape of the light guide 110 as viewed in the Y direction or having substantially same size as such a circle. The hole formed by the engagement portion 162 is in communication with the light-source space 165. When the plane 136 of the first light outgoing area 122 or the curved face thereof is provided so as to extend to an end face 168 of the light guide 110, the engagement portion 162 includes an abut portion (first abut portion) abutting the first light outgoing area 122 when the end of the light guide 110 is engaged.

According to such a structure, when the light source 113 and the light guide 110 are held by the holder 114, the LED 151 faces the end face 168 of the light guide 110, and the end of the light guide 110 is covered by the holder 114. In this case, it is desirable that the LED 151 should be disposed near the end face 168 of the light guide 110.

Each holder 114 is formed of, for example, a white resin like polycarbonate so as to diffuse and reflect light emitted by the LED 151. It is desirable that a surface forming the light-source space 165 of the holder 114 and a surface forming the hole of the engagement portion 162 should have a high reflection rate in order to increase the illuminance on the reading face of the document 104. Accordingly, such surface is formed as a satin-finished surface or a mirror surface.

As illustrated in, for example, FIG. 3, the substrate 152 is provided with a heat sink 169 on the back face of the light source 113, that is, on a surface of the substrate 152 where no LED 151 is provided to suppress a temperature rise while the LED 151 is emitting light.

As illustrated in FIG. 1, the plane mirror 115 includes a flat mirror surface extending in the Y direction as a stripe. The plane mirror 115 can be formed by, for example, depositing a metal like aluminum on a polished surface of a glass substrate to form a flat mirror surface, or by polishing one surface of a metal member like aluminum to form a flat mirror surface. It is desirable that the mirror surface of the plane mirror 115 should have a high reflection rate to increase the illuminance on the reading face of the document 104. Accordingly, for example, a reflection rate increasing coating may be applied to the mirror surface.

As illustrated in FIG. 2, the plane mirror 115 is disposed in a direction facing the second light outgoing area 124 from the second prism group 123. The shorter direction (hereinafter, referred to as "X direction") of the irradiation device 101 is defined by, as viewed in the Y direction, a direction of a line interconnecting the axis 126 of the light guide 110 with a point (typically, the center of the mirror surface of the plane mirror 115) 170 on the mirror surface of the plane mirror 115.

The mirror surface of the plane mirror 115 is directed in the direction of the second light outgoing area 124 as viewed in a perpendicular direction (Z direction) to both X and Y directions, and is desirably widespread across the whole area where secondary light Ls passes. Accordingly substantially all pieces of secondary light Ls emitted from the second light outgoing area 124 are reflected. The mirror surface of the plane mirror 115 is disposed so as to be directed in a direction in which the reflected secondary light Ls and primary light Lm emitted from the first light outgoing area 122 overlaps on the read area 105. The area where the primary light Lm and the secondary light Ls overlap defines the read area 105.

It is desirable that the read area 105 should be formed on a plane vertical to the X direction and at equal distances from the axis 126 of the light guide 110 and a line 170 on the mirror surface of the plane mirror 115 extending in the Y direction (typically, the center line of the mirror surface of the plane mirror 115 extending in the Y direction).

The reader device 102 is a device that receives light which is light (reflected light) reflected by the reading face emitted from the irradiation device 101, and outputs image data. The reader device 102 includes, as illustrated in FIG. 1, multiple reading-system mirrors 175, an optical lens 176, and an image sensor 177.

Each reading-system mirror 175 includes, for example, a flat mirror surface in a stripe shape parallel with the Y direction. At least one mirror surface of the multiple reading-system mirrors 175 is disposed on a reflection passage 180 (see FIG. 2) where reflected light travels. In addition, the multiple reading-system mirrors 175 guide the reflected light to the optical lens 176. The optical lens 176 converges light guided by the multiple reading-system mirrors 175, and forms an image of the read area 105 on the image sensor 177. The image sensor 177 is, for example, a CCD (Charge Coupled Device) image sensor, or a CMOS (Complementary Metal-Oxide-Semiconductor) image sensor, converts received light into electric signals (image data), and outputs the image data.

So far, the explanation was given of the structure of the image-reading device 100. In the followings, an explanation will be given of a process that the image-reading device 100 generates image data with reference to the drawings.

For the purpose of explanation, respective directions are defined more specifically. The X and Y directions are horizontal directions. The perpendicular direction to the X and Y directions, that is, the height direction is defined as the Z direction. Next, the direction from the axis 126 of the light guide 110 toward the center line 170 of the plane mirror 115 is defined as the positive X direction (direction indicated by arrow in shorter direction X in, for example, FIG. 1), and the opposite direction is defined as the negative X direction. The depthwise direction when the positive X direction is left is defined as the positive Y direction (direction indicated by arrow in longer direction Y in, for example, FIG. 1), and the opposite direction is defined as the negative Y direction. In FIG. 1, the document 104 placed on the contact glass 103 is faced down, and the irradiation device 101 emits light to the document 104 from the bottom. The upper direction in the height (direction indicated by arrow in height direction Z in, for example, FIG. 1) is defined as the positive Z direction, and the opposite direction is defined as the negative Z direction. That is, the coordinate system XYZ is a left-hand system. Those directions are defined for the explanation purpose only, and are not intended to limit the present disclosure.

For example, as illustrated in FIG. 2, the document 104 is placed on the contact glass 103 with the reading face facing down. Power is supplied to each LED 151 through the substrate 152, and each LED 151 emits light. The light emitted by each LED 151 enters the interior of the light guide 110 through the end face 168 thereof.

According to this embodiment, the surface forming the light-source space 165 of the holder 114 has a high reflection rate. Hence, not only the light emitted by each LED 151 directly enters the interior through the end face 168 of the light guide 110, but also the light reflected by the surface forming the light-source space 165 of the holder 114 enters. In addition, the engagement portion 162 of the holder 114 covers the end of the light guide 110 with a surface having a high reflection rate. Accordingly, a leakage of light from the external face of the end of the light guide 110 can be prevented. Therefore, the utilization efficiency of the light emitted by the LED 151 can be improved.

The light entered the interior of the light guide 110 is fully reflected by the internal face of the light guide 110 and is propagated, as propagating light Lp, in the interior of the light guide 110 substantially in the positive and negative Y directions if not colliding the first and second prism groups 121 and 123 as will be discussed later. FIGS. 3 and 5 illustrate the propagating light Lp near the end of the light guide 110 at the negative-Y-direction side, and the propagating light Lp in both figures is propagated in the positive Y direction.

Some propagating lights Lp are, as illustrated in FIG. 3, diffused and reflected by the first prism group 121 and the first reflector 111. Some propagating lights Lp are reflected by the first prism group 121. Some lights passing through the first prism group 121 is reflected and diffused by the first reflector 111, and are re-enter the interior of the light guide 110 through the first prism group 121.

The light diffused and reflected by the first prism group 121 and the first reflector 111 is, as illustrated in FIG. 2, emitted as the primary light Lm from the first light outgoing area 122 substantially facing the first prism group 121 across the axis 126 of the light guide 110. At least some primary lights Lm are deflected by the contact glass 103 as illustrated in the figure, and travels to the read area 105 from an oblique downward right direction.

As illustrated in FIG. 5, some propagating lights Lp are diffused and reflected by the second prism group 123 and the second reflector 112. Some propagating lights Lp are reflected by the second prism group 123, and some lights passing through the second prism group 123 are reflected and diffused by the second reflector 112, and re-enter the interior of the light guide 110 through the second prism group 123.

The diffused and reflected light by the second prism group 123 and the second reflector 112 is emitted as the secondary light Ls from the second light outgoing area 124 substantially facing the second prism group 123 across the axis 126 of the light guide 110.

Since the plane mirror 115 is disposed in a direction facing the second light outgoing area 124 from the second prism group 112, as illustrated in FIG. 2, the secondary light Ls is reflected by the plane mirror 115. At least some secondary lights Ls are deflected by the contact glass 103 as illustrated in the figure, and travel to the read area 105 in an oblique downward left direction.

As explained above, in the read area 105, the primary light Lm traveling in the oblique downward right direction and the secondary light Ls traveling in the oblique downward left direction overlaps.

The first light outgoing area 122 has the plane portion 136, while the second light outgoing area 124 is formed by a circumference. The primary light Lm has a wider divergence angle than that of the secondary light Ls.

Unlike the primary light Lm, the secondary light Ls passes through the plane mirror 115 until reaching the read area 105. Accordingly, the passage of the secondary light Ls from the second light outgoing area 124 to the read area 105 is longer than the passage of the primary light Lm from the first light outgoing area 122 to the read area 105.

Since the divergence angle and the passage differ between the primary light Lm and the secondary light Ls, a width of the primary light Lm and that of the secondary light Ls in the X direction with an illuminance that is equal to or higher than a predetermined value become substantially same level regardless of the position in the Z direction.

As to this point, a detailed explanation will be given with reference to the drawing illustrating a illuminance distribution in the X direction at different positions in the Z direction. The top face of the contact glass 103 is taken as a reference (0 mm) for the position in the Z direction, and the read area 105 is taken as a reference (0 mm) for the position in the X direction.

Figure 6A:
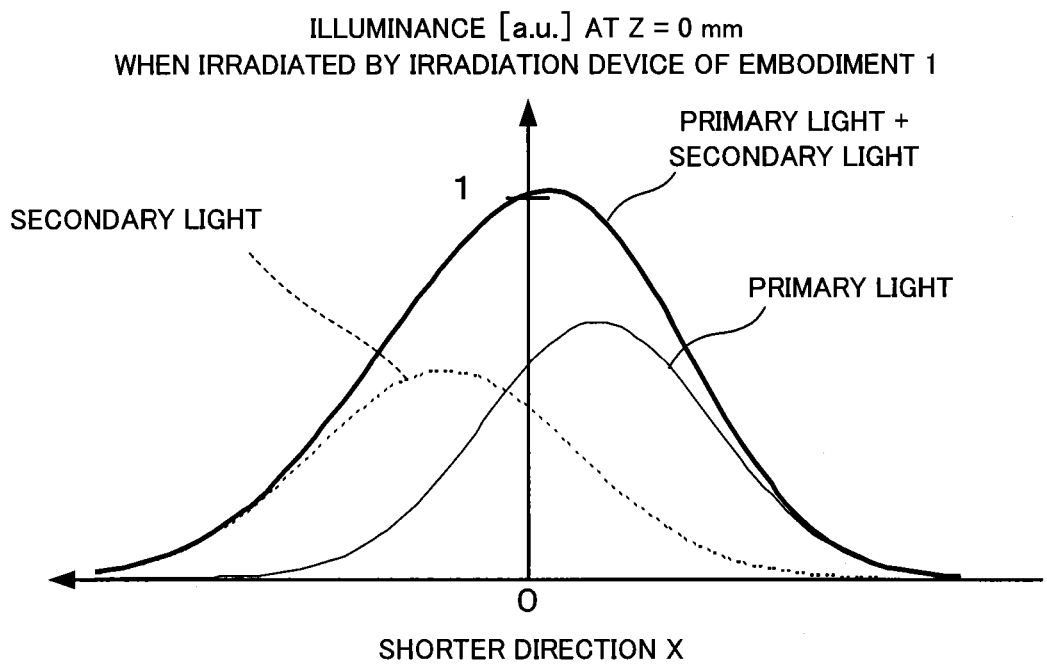
FIG. 6A is a diagram illustrating an illuminance distribution in an X direction on a top face of a contact glass when irradiated by the irradiation device of Embodiment 1.
Figure 6B:
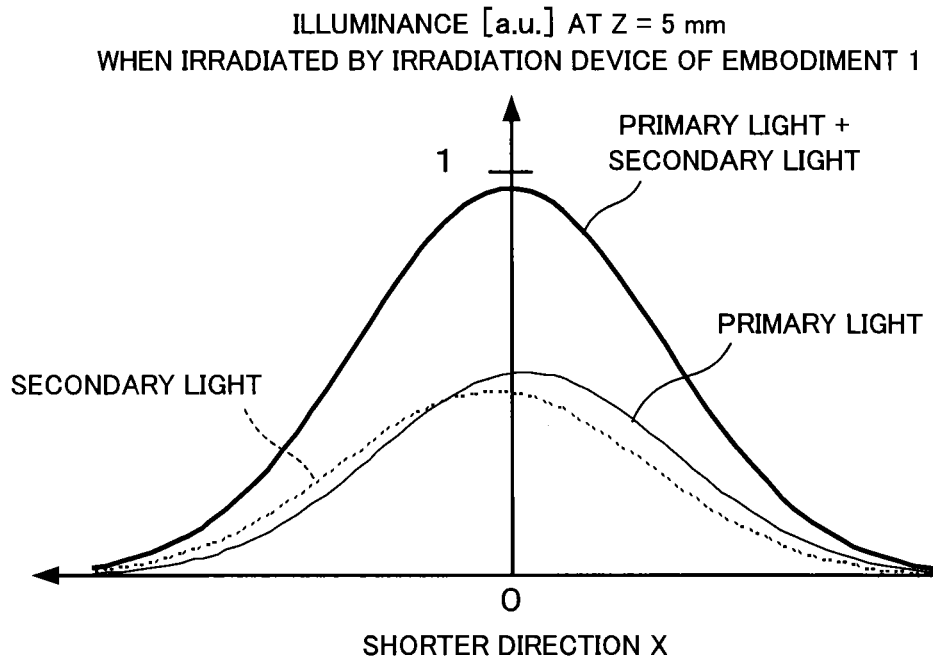
FIG. 6B is a diagram illustrating an illuminance distribution in the X direction at an area 5 mm above the contact glass when irradiated by the irradiation device of Embodiment 1.
Figure 6C:
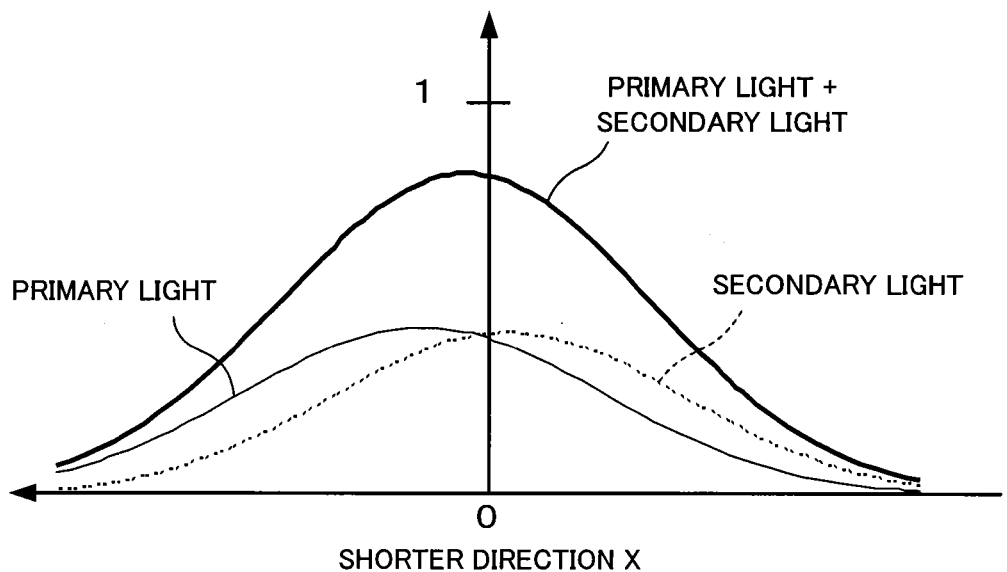
FIG. 6C is a diagram illustrating an illuminance distribution in the X direction at an area 10 mm above the contact glass when irradiated by the irradiation device of Embodiment 1.

FIG. 6A is a diagram illustrating a illuminance distribution in the X direction on the top face of the contact glass when irradiated by the irradiation device according to Embodiment 1. FIG. 6B is a diagram illustrating an illuminance distribution in the X direction 5 mm above the contact glass when irradiated by the irradiation device of Embodiment 1. FIG. 6C is a diagram illustrating an illuminance distribution in the X direction 10 mm above the contact glass when irradiated by the irradiation device of Embodiment 1.

With reference to FIGS. 6A to 6C, a width of the primary light Lm and that of the secondary light Ls in the X direction with an illuminance of equal to or greater than a predetermined value are substantially same regardless of the position in the Z direction. In addition, the peak position of the primary light Lm and that of the secondary light Ls are substantially symmetrical relative to X=0 (the absolute value of the peak position X is substantially consistent). Hence, even if the position in the Z direction changes, the synthesis illuminance distribution (primary light+secondary light in the figure) obtained by adding the illuminance distribution of the primary light Lm with that of the secondary light Ls is symmetrical relative to the axis of X=0, and the peak position of the illuminance in the X direction hardly changes.

In addition, since both primary light Lm and secondary light Ls are diffusion lights, when the position in the Z direction changes from 0 mm to 5 mm, and also to 10 mm, the respective widths in the X direction change, while at the same time, the width of the area in the X direction where the primary light Lm and the secondary light Ls overlap (effective irradiated area 182 in FIG. 2) becomes gradually wide. Accordingly, even if the position in the Z direction changes, the total illuminance of the primary light Lm and the secondary light Ls hardly changes.

Figure 7A:
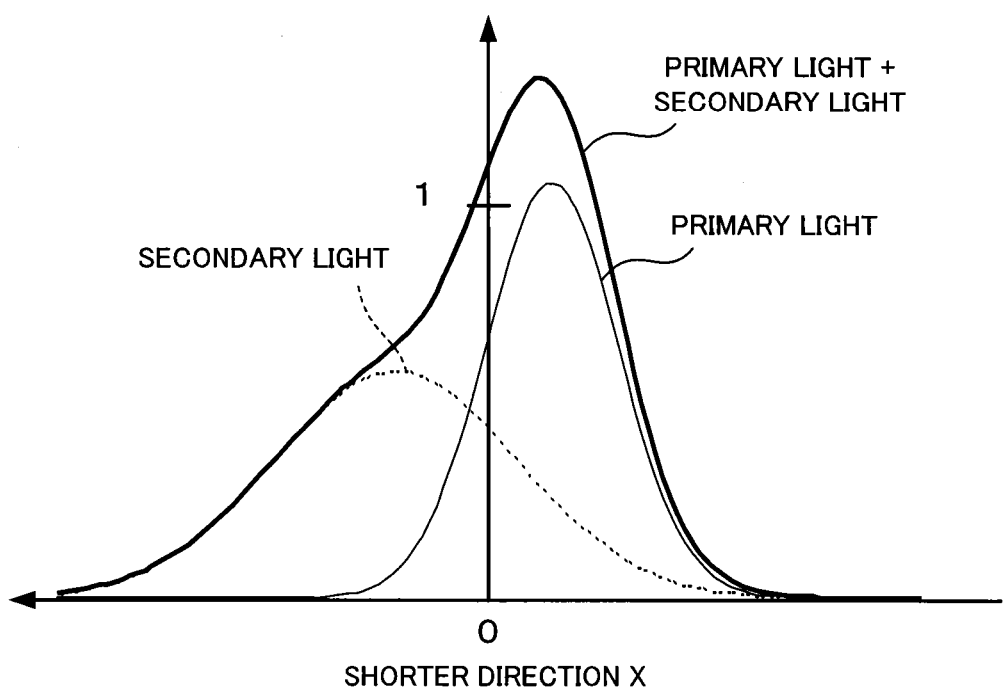
FIG. 7A is a diagram illustrating an illuminance distribution in the X direction on a top face of a contact glass when irradiated by the irradiation device for the purpose of comparison.
Figure 7B:
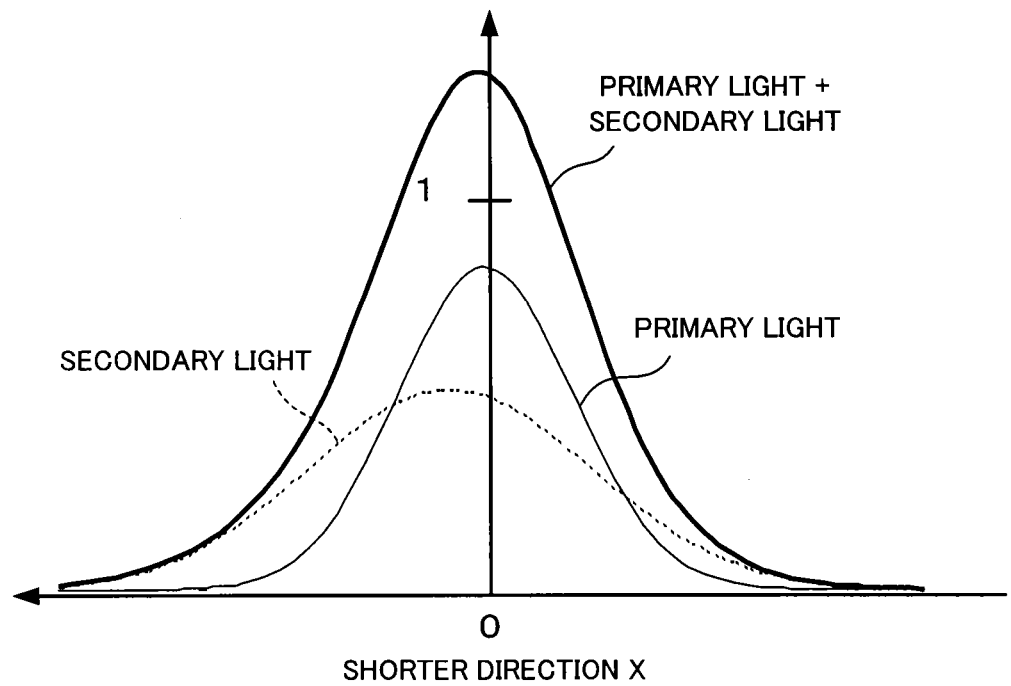
FIG. 7B is a diagram illustrating an illuminance distribution in the X direction at an area 5 mm above the contact glass when irradiated by the irradiation device for the purpose of comparison.
Figure 7C:
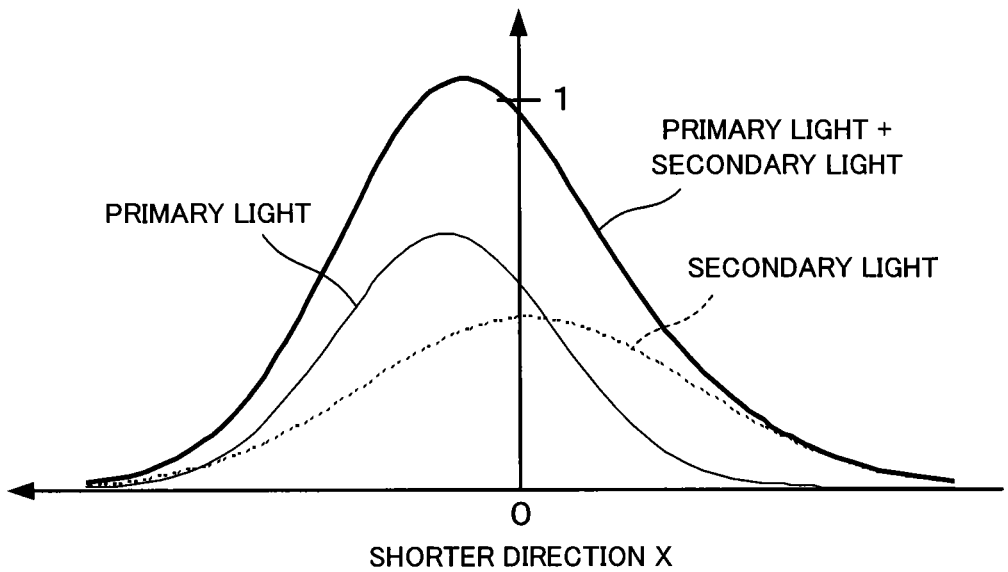
FIG. 7C is a diagram illustrating an illuminance distribution in the X direction at an area 10 mm above the contact glass when irradiated by the irradiation device for the purpose of comparison.

As a comparison example for this case, FIGS. 7A to 7C respectively illustrate illuminance distributions in the X direction at Z=0 mm, 5 mm, and 10 mm when irradiated by an irradiation device (comparison irradiation device) having a first light outgoing area formed of only a circumference, that is, having a curvature of 1/R that is equal to that of the second light outgoing area 124 instead of the first light outgoing area 122 of the irradiation device 101 of this embodiment.

With reference to FIGS. 7A to 7C, the width of the primary light Lm in the X direction with an illuminance of equal to or higher than a predetermined value is narrower than that of the secondary light Ls, and the primary light Lm has a higher peak illuminance than that of the secondary light Ls. Accordingly, when the position in the Z direction changes from 0 mm to 5 mm, and also to 10 mm, the position in the X direction where the illuminance distribution of the primary light Lm becomes the peak moves, and together with such a movement, the position in the X direction where the synthesis illuminance distribution becomes the peak largely moves.

As explained above, according to the irradiation device 101 of this embodiment, the primary light Lm and the secondary light Ls are coming in different right and left oblique downward directions to the read area 105 and the space thereabove, and the width of the primary light Lm and that of the secondary light Ls in the X direction with an illuminance of equal to or higher than a predetermined value become substantially same regardless of the position in the Z direction. In addition, as moving in the positive Z direction, the width of the effective irradiated area 182 where the primary light Lm and the secondary light Ls overlap becomes gradually wide.

Based on those facts, it is possible to reduce a change in the illuminance, that is, to increase the lighting depth even if the position of the reading face of the document 104 changes in the Z direction from the read area 105. In this case, a change in the illuminance in the height direction (lighting depth direction) of the irradiated surface will be compared for the irradiation device of this embodiment and for the comparative example.

Figure 8:
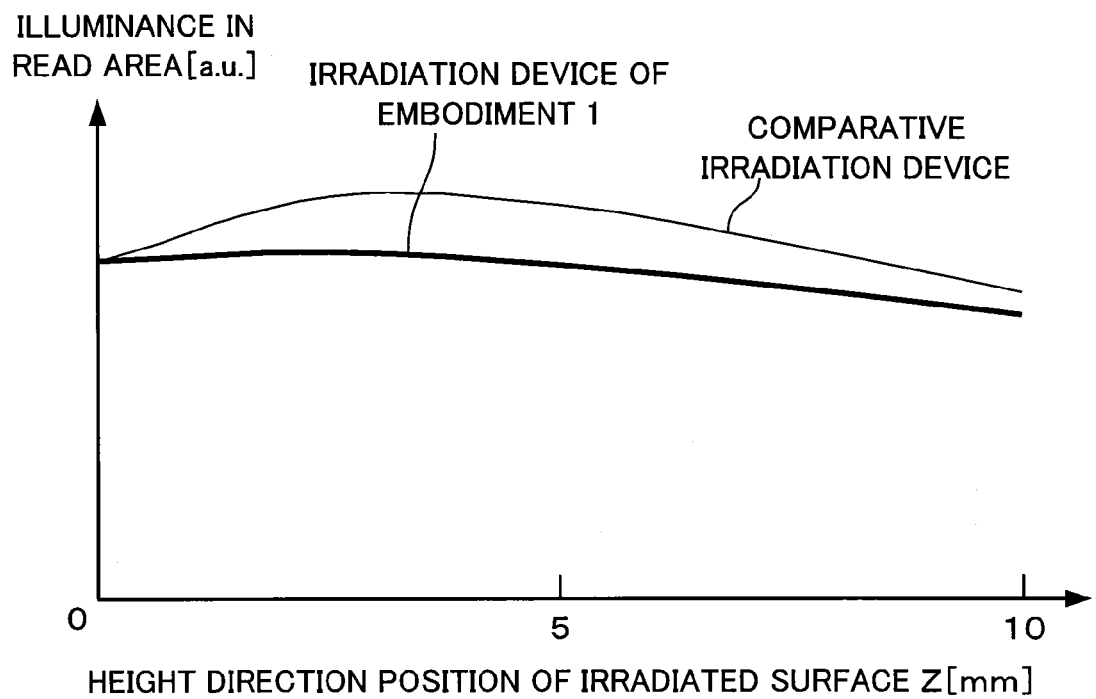
FIG. 8 is a diagram illustrating a position of an irradiated area in a read area in a height direction and a change in a illuminance.

FIG. 8 is a diagram illustrating a change in the height direction position of the irradiated surface in the read area and a change in the illuminance for each of the irradiation device 101 of this embodiment and for the comparative irradiation device. In FIG. 8, the illuminance when Z=0 mm is normalized as 1 for both irradiation device 101 and comparative irradiation device. As is clear from FIG. 8, the irradiation device 101 of this embodiment has a smaller change in the illuminance relative to a change in the position in the Z direction than that of the comparative irradiation device.

As a result, even if, for example, like the opened portion of a book between pages, the reading face becomes distant from the read area 105 set on the contact glass 103, it is possible to properly emit light to the reading face of the document 104.

In addition, according to the irradiation device 101 of this embodiment, the plane mirror 115 is utilized which has a mirror face with a linear cross-sectional shape not an oval or radial cross-sectional shape (toroidal mirror) as viewed in the Y direction. In the assembling of the irradiation device 101, it is necessary to have highly precise six kinds of degree of freedom to set the posture of the mirror face when the shape of the mirror face is oval or radial as viewed in the Y direction. In the case of the plane mirror 115, however, at least three kinds of degree of freedom: two linear directions along the mirror face; and the rotation within the mirror face need not to be highly precise. Hence, the irradiation device 101 can be easily assembled.

Since the manufacturing of the plane mirror 115 is easier than that of toroidal mirrors, the plane mirror is inexpensive. As a result, the costs of the irradiation device 101 can be reduced. Since the measurement of the shape of the mirror face is easy, the quality control of the irradiation device 101 becomes easy.

When the first light outgoing area 122 has a plane portion, the contour shape becomes a shape like a cylindrical member having a part cut in the Y direction. Accordingly, the light guide 110 can be manufactured by injection molding using a resin like polycarbonate or a cyclo-olefin-based resin. In this case, a production of shrinkage cavity is not likely to occur, and the necessary precision in shape can be easily accomplished. In addition, since the cross-sectional shape of the light guide 110 includes mainly a circular arc and a straight line, the measurement of such a shape is easy, and thus the quality control becomes easy.

Still further, when the holder 114 is provided with a recess that makes the light-source space 165 narrower than the engagement portion 162, and the end face 168 of the light guide 110 abuts this recess, the light guide 110 can be engaged in a manner positioned relative to the holder 114. When the engagement portion 162 has a first abut portion where the first light outgoing area 122 abuts, those have a flat surface or a curved face with a different curvature from a circle that is the general shape of the cross section of the light guide 110. In this case, the positioning in the rotation direction around the axis 126 of the light guide 110 is also facilitated. Hence, this structure also facilitates assembling of the irradiation device 101.

In addition, several hundred to several thousand prisms 132 forming the first prism group 121 and the second prism group 123 are arranged side by side in the Y direction at irregular pitches, and thus the illuminance distribution in the Y direction and in the read area 105 can be made as a target distribution, for example, a COS-biquadratic distribution.

Still further, since the first reflector 111 has a high reflection rate, the light passing through the first prism group 121 can be caused to re-enter the interior of the light guide 110. Accordingly, many lights entering the first prism group 121 can be emitted from the first light outgoing area 122. Hence, the illuminance in the reading face of the document 104 can be increased.

The same is true of the second reflector 112. Since the second reflector 112 has a high reflection rate, many lights entering the second prism group 123 can be emitted from the second light outgoing area 124, and thus the illuminance in the reading face of the document 104 can be increased.

As illustrated in FIG. 2, the primary light Lm and the secondary light Ls are emitted to the reading face of the document 104 placed on the read area 105 or thereabove in oblique downward right direction and in oblique downward left direction, respectively. The primary light Lm and the secondary light Ls are reflected/absorbed by the reading face of the document 104, and are diffused. The reflected light is reflected and diffused in accordance with the reflection/absorption rate distribution of the reading face, and includes information on the reading face. The image of the read area 105 is formed by the reading-system mirrors 175 of the reader device 102 and the optical lens 176, and is optically received by the image sensor 177. The image sensor 177 outputs electric signals in accordance with the intensity of the received light. Such electric signals are image data containing information on the portion the reading face irradiated with the primary light Lm and the secondary light Ls by the irradiation device 101.

The reader device 102 outputs image data in this way. For example, the irradiation device 101 emits light to the predetermined area of the reading face of the document 104 while moving in the X direction by an unillustrated drive device. The document 104 may be fed in the X direction by the drive device instead of causing the irradiation device 101 to move, and the irradiation device 101 can also emit light to the predetermined area of the reading face according to this structure.

The reader device 102 sequentially outputs pieces of image data corresponding to the irradiated portions. The pieces of image data sequentially output are stored in a memory, and image data containing the information represented on the predetermined area of the reading face of the document 104 is generated. In this case, the memory that stores the pieces of image data sequentially output may be possessed by the reader device 102, or may be possessed by a device connected with the reader device 102.

Even if the reading face becomes apart from the read area 105 set on the contact glass 103 as explained above, it is possible to appropriately emit light to the reading face of the document 104. Hence, according to the image-reading device 100 of this embodiment, even if the height of the irradiated surface changes, it is possible to output excellent image data having little contrast change.

Embodiment 1 of the present disclosure was explained above, but the embodiment is not limited to the above-explained structure.

According to Embodiment 1, the explanation was given of an example case in which the cross section of the light guide 110 is a substantially circular shape, that is, in the cross section of the light guide 110, a circular shape having the first prism group 121, the second prism group 123, and the plane portion 136 of the first light outgoing area 122 cut out. However, the general shape of the cross section of the light guide 110 is not limited to a circular shape.

The light guide 110 may have, for example, an oval cross section. In this case, when the irradiation device 101 is assembled, if the rotation direction around the axis 126 of the light guide 110 is set appropriately, the first light outgoing area 122 at least partially having a smaller curvature than that of the second light outgoing area 124 can be realized. Needless to say, the first light outgoing area 122 can be provided with, like Embodiment 1, a flat face or a curved face at least partially having a smaller curvature than that of the second light outgoing area 124 by, for example, processing a bar-shaped member with an oval cross section.

In Embodiment 1, both holders 114 have the respective light sources 113, but it is fine if one of the holders 114 have no light source 113 but hold only the end of the light guide 110.

According to Embodiment 1, the number of prisms 132 forming the first prism group 121 and that of the second prism group 123 are substantially same. However, it is desirable that the number of prisms 132 forming the second prism group 123 should be larger than that of the first prism group 121.

As explained in Embodiment 1, the secondary light Ls is reflected by the plane mirror 115, and then reaches the read area 105, while the primary light Lm reaches the read area 105 without through the mirror. Accordingly, depending on the reflection rate of the plane mirror 115, the illuminance of the secondary light Ls in the read area 105 becomes smaller than that of the primary light Lm.

Hence, as explained above, when the number of prisms 132 forming the second prism group 123 is larger than that of the first prism group 121, the adverse effect originating from the reflection rate of the plane mirror 115 can be reduced, and it becomes possible for the primary light Lm and the secondary light Ls to have similar illuminance in the read area 105. As a result, the lighting depth can be further made deep. When, for example, the reflection rate of the plane mirror 115 is 95%, it is appropriate if the number of prisms 132 of the second prism group 123 is set to be larger than that of the first prism group 121 by 5%.

Figure 9:
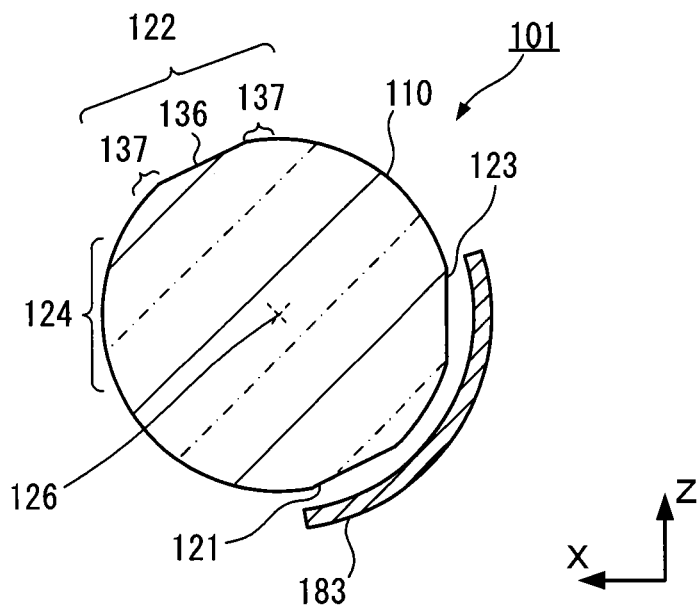
FIG. 9 is a cross-sectional view illustrating a light guide of an irradiation device according to Modified Example 1 and a nearby portion as viewed in a lengthwise direction.

According to Embodiment 1, the explanation was given of an example case in which the first reflector 111 and the second reflector 112 are formed of separate members, but the structures of the reflectors reflecting lights passing through the first prism group 121 and the second prism group 123 are not limited to this case. For example, according to Modified Example 1, an irradiation device includes, instead of the first reflector 111 and the second reflector 112 of the irradiation device 101 of Embodiment 1, as illustrated in FIG. 9, a reflector 183 which is a reflector member and which is a single piece covering both first prism group 121 and second prism group 123.

By employing the single reflector 183, the number of steps of assembling the irradiation device can be reduced, and thus the irradiation device can be assembled further easily. In addition, when, for example, the reflector 183 is formed of a white resin like polycarbonate, if the reflector 183 is a single piece, the costs for molding can be reduced, and thus the irradiation device can be made further inexpensive.

According to Embodiment 1, the first diffusion/reflection portion includes the first prism group 121 and the first reflector 111, and the second diffusion/reflection portion includes the second prism group 123 and the second reflector 112. However, the structure of the first diffusion/reflection portion or the second diffusion/reflection portion is not limited to this structure.

For example, depending on the shape of the prisms 132 forming the first prism group 121 or the second prism group 123, many lights entering the first prism group 121 or the second prism group 123 do not pass through such a prism group but are reflected. In such a case, it is unnecessary to provide the first reflector 111 or the second reflector 112. According to this structure, the same advantageous effects as those of Embodiment 1 can be accomplished, and the assembling of the irradiation device can be made further easier. In addition, the irradiation device can be made inexpensive.

Figure 10:
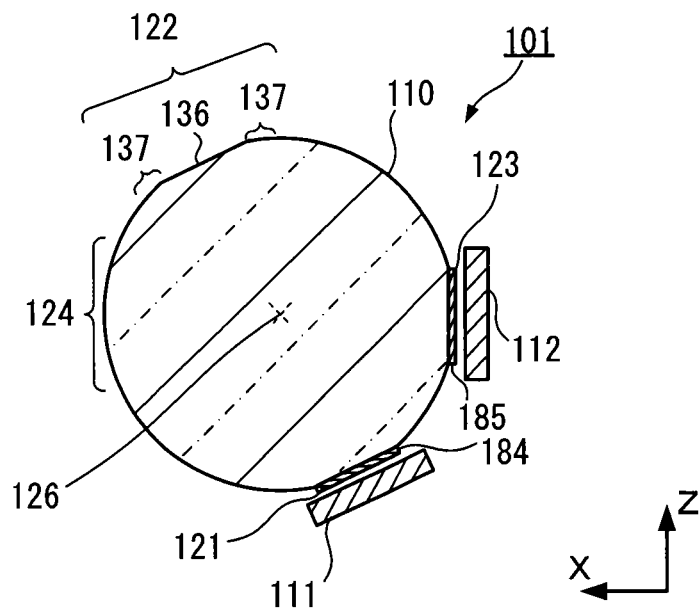
FIG. 10 is a cross-sectional view illustrating a light guide of an irradiation device according to Modified Example 2 and a nearby portion as viewed in a lengthwise direction.
Figure 11:
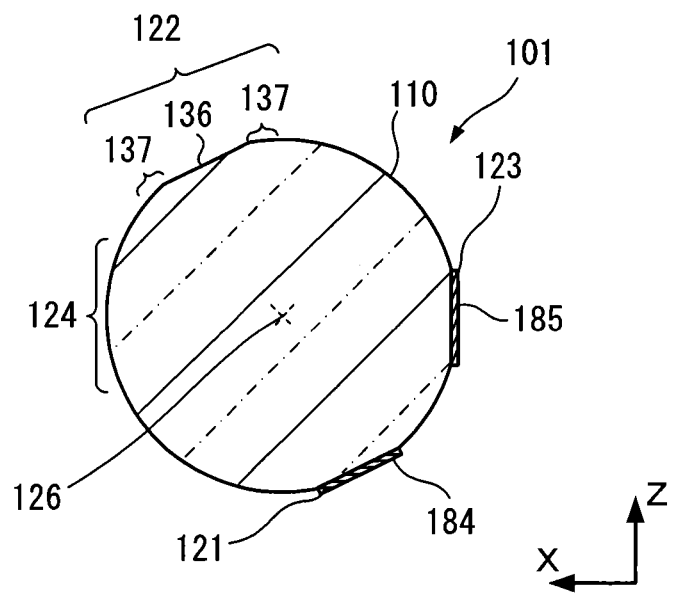
FIG. 11 is a cross-sectional view illustrating a light guide of an irradiation device according to Modified Example 3 as viewed in a lengthwise direction.

In addition, for example, the first diffusion/reflection portion includes, together with the first reflector 111 like the irradiation device illustrated in FIG. 10 according to Modified Example 2, or instead of the first reflector 111 (see FIG. 11) like the irradiation device illustrated in FIG. 11 according to Modified Example 3, a first reflection/scattering substance layer 184 containing reflection/scattering substances and provided on the outer surface of the light guide 110 in the lengthwise direction. For example, the first reflection/scattering substance layer 184 may be provided on the whole outer surface of the first prism group 121, or may be provided as a set of stripes arranged side by side in the Y direction at irregular pitches like the prisms 132 forming the first prism group 121 on the outer surface of the first prism group 121. For example, the first reflection/scattering substance layer 184 can be provided by applying a material containing the reflection/scattering substances. In this case, the reflection/scattering substances are materials that reflect and scatter light, and are, for example, white materials.

According to this structure, also, the propagating light Lp entering the first prism group 121 can be emitted from the first light outgoing area 122. Therefore, the same advantageous effects as those of Embodiment 1 can be accomplished.

The second diffusion/reflection portion includes, together with the second reflector 112 like the irradiation device illustrated in FIG. 10 according to Modified Example 2, or instead of the second reflector 112 like the irradiation device illustrated in FIG. 11 according to Modified Example 3, a second reflection/scattering substance layer 185 containing reflection/scattering substances and provided on the outer surface of the light guide 110 in the lengthwise direction like the first reflection/scattering substance layer 184. According to this structure, also, the propagating light Lp entering the second prism group 123 can be emitted from the second light outgoing area 124. Hence, the same advantageous effects as those of Embodiment 1 can be accomplished.

When both of the first prism group 121 and the second prism group 123 include the respective reflection/scattering substance layers, the amount of reflection/scattering substances contained in the reflection/scattering substance layer of the second diffusion/reflection portion may be larger than that of the reflection/scattering substances contained in the reflection/scattering substance layer of the first diffusion/reflection portion. As to the adjustment of the amount of reflection/scattering substances, for example, the pitch, the width, and the like of the reflection/scattering substance layers in the Y direction may be changed between the first diffusion/reflection portion and the second diffusion/reflection portion.

According to this structure, like the increase in the number of prisms 132 of the second prism group 123 more than that of the first prism group 121, the adverse effect originating from the reflection rate of the plane mirror 115 can be reduced, and the primary light Lm and the secondary light Ls can have a similar illuminance in the read area 105. As a result, the lighting depth can be further increased.

Figure 12:
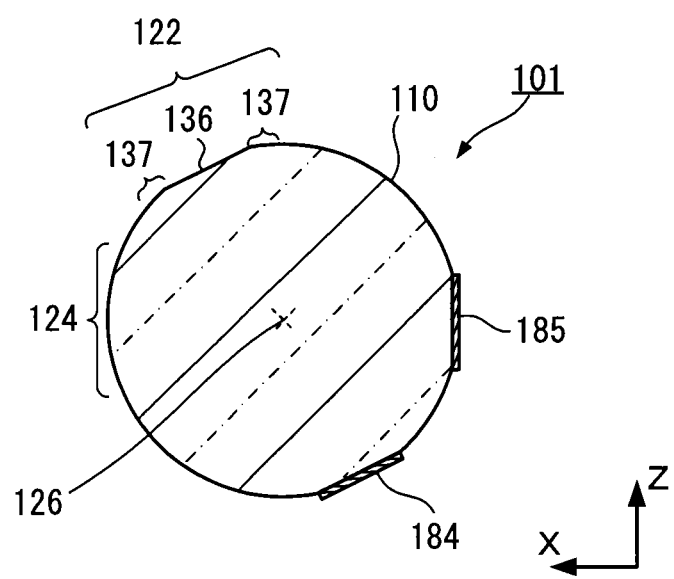
FIG. 12 is a cross-sectional view illustrating a light guide of an irradiation device according to Modified Example 4 as viewed in a lengthwise direction.

Still further, like the irradiation device illustrated in FIG. 12 according to Modified Example 4, the first diffusion/reflection portion may include, instead of the first prism group 121 and the first reflector 111, the first reflection/scattering substance layer 184 provided on the external face of the light guide 110 in the lengthwise direction and containing the reflection/scattering substances. Likewise, the second diffusion/reflection portion may include, instead of the second prism group 123 and the second reflector 112, the second reflection/scattering substance layer 185. The first reflection/scattering substance layer 184 or the second reflection/scattering substance layer 185 may be provided by applying, for example, a material containing the reflection/scattering substances to the external face of the light guide 110. As explained above, the reflection/scattering substances are materials that reflect and diffuse light, and are, for example, white materials.

According to this structure, also, the propagating light Lp entering the first diffusion/reflection portion can be emitted from the first light outgoing area 122. In addition, the propagating light Lp entering the second diffusion/reflection portion can be emitted from the second light outgoing area 124. Therefore, the same advantageous effects as those of Embodiment 1 can be accomplished.

In this case, like the prisms 132 forming the first prism group 121 or the second prism group 123, it is desirable that the reflection/scattering substance layer should be formed as stripes arranged side by side in the Y direction at irregular pitches. According to this structure, it becomes possible to set the illuminance in the Y direction in the read area 105 to be a target distribution like a COS-biquadratic distribution.

When both first diffusion/reflection portion and second diffusion/reflection portion are formed of the respective reflection/scattering substance layers, it is desirable that the amount of reflection/scattering substances contained in the reflection/scattering substance layer of the second diffusion/reflection portion should be larger than that of the first diffusion/reflection portion. To adjust the amount of reflection/scattering substances, the pitch, width, and the like of the stripes forming the reflection/scattering substance layer in the Y direction are changed between the first diffusion/reflection portion and the second diffusion/reflection portion.

Accordingly, like the increase of the number of the prisms 132 of the second prism group 123 more than that of the first prism group 121, the adverse effect originating from the reflection rate of the plane mirror 115 can be reduced, and the secondary light Ls and the primary light Lm can have a similar illuminance on the top face of, for example, the contact glass 103. As a result, the lighting depth can be made further deep.

Embodiment 2

Figure 13:
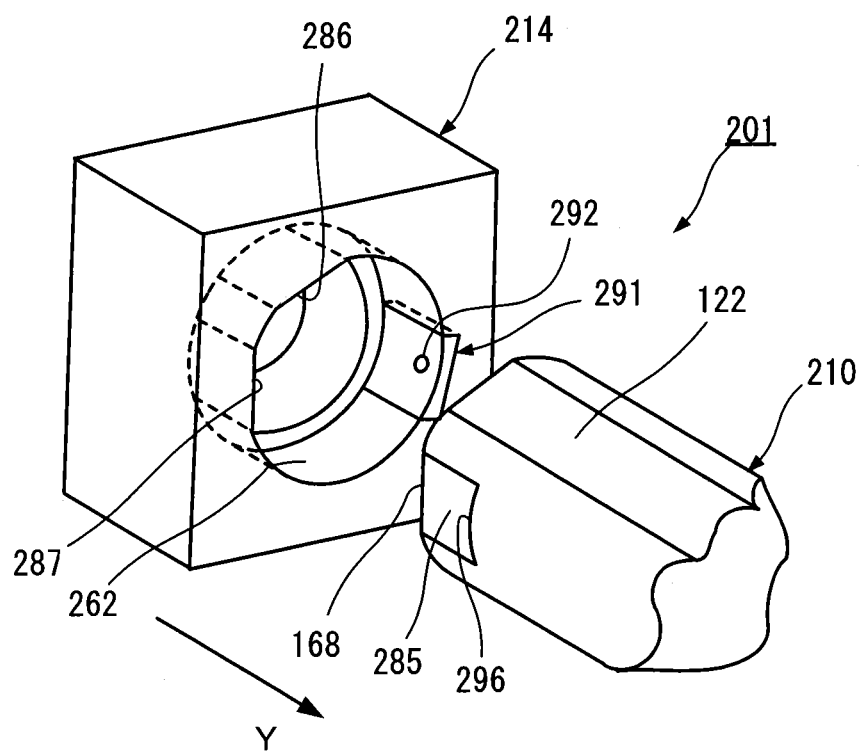
FIG. 13 is an exploded perspective view illustrating a nearby portion of an end of a light guide and a holder thereof according to Embodiment 2 of the present disclosure.

According to Embodiment 2, a light guide and a holder are different from the light guide 110 and the holder 114 of Embodiment 1. As illustrated in FIG. 13, an end of a light guide 210 of this embodiment includes a notch 285. The notch 285 forms a plane extending in the Y direction from an end face 168 of the light guide 210. The notch 285 is formed at a different location from a first light outgoing area 122. The length of the notch 285 in the Y direction is consistent with or slightly larger than an engagement length of the light guide 210 with an engagement portion 262 of a holder 214.

The holder 214 employs substantially same structure as that of the holder 114 of Embodiment 1, but the shape of the hole formed by the engagement portion 262 of the holder 214 is different from that of the holder 114 of Embodiment 1. As viewed in the Y direction, the engagement portion 262 forms a substantially circular hole that is slightly larger than or is consistent with the circle which is the general shape of the cross section of the light guide 210. The engagement portion 262 includes, in addition to a first abut portion 286 like Embodiment 1 abutting the first light outgoing area 122 when the end of the light guide 210 is engaged, a second abut portion 287 abutting the notch 285 when the end of the light guide 210 is engaged.

In addition, as illustrated in FIG. 13, the holder 214 also includes a pushing portion 291. The pushing portion 291 pushes the first light outgoing area 122 against the first abut portion 286 when the end of the light guide 210 is engaged, and pushes the external face of the end of the light guide 210 in a direction in which the notch 285 is pushed against the second abut portion 287.

More specifically, for example, the pushing portion 291 includes a resin-made pin 292, and a metal spring pushing the pin 292 toward the center of the circle forming the general shape of the hole of the engagement portion 262 as viewed in the Y direction. As viewed in the Y direction, through the center of the circle forming the general shape of the hole of the engagement portion 262 as viewed in the Y direction, the pin 292 should be disposed between an opposite location to the first abut portion 286 and an opposite location to the second abut portion 287 through that center (desirably, the middle location therebetween), and at an area other than the first abut portion 286 and the second abut portion 287. The pushing portion 291 may be formed integrally with the holder 214 by, for example, injection molding.

Accordingly, by the one pushing portion 291, when the end of the light guide 110 is engaged, the external face of the end of the light guide 210 is pushed in a direction in which the first light outgoing area 122 is pushed against the first abut portion 286, and the notch 285 is pushed against the second abut portion 287. Note that multiple pushing portions 291 may be provided.

According to this second embodiment, when the end of the light guide 210 is engaged, the first light outgoing area 122 and the notch 285 are pushed against the first abut portion 286 and the second abut portion 287, respectively. Accordingly, the light guide 210 can be positioned in the surface perpendicular to the Y direction, while at the same time, the angle of the rotation direction around the axis of the light guide 210 is also set. Hence, when assembling an irradiation device 201 of this embodiment, it is easy to set the position of the light guide 210 in the surface perpendicular to the Y direction and the angle of the rotation direction around the axis 126 of the light guide 210. As a result, the irradiation device 201 can be steadily manufactured which has little individual difference in the illuminance distribution in the X direction on the reading face of the document 104.

In addition, when the light guide 210 is manufactured by injecting molding of a resin like polycarbonate or cyclo-olefin-based resin, it is necessary to form a gate for injection anywhere in the outer surface of the light guide 210. According to this embodiment, as is indicated by a dashed-line oval 296 illustrated in FIG. 14, the gate can be provided at an area (light blocking area) near the notch 285 among the external face of the light guide 210, and where no propagating light Lp at the center side of the light guide 210 along the Y direction from the notch 285 comes.

In general, in order to reflect substantially all lights by the internal face of the light guide 210 to propagate the propagating light Lp, it is desirable that the internal face of the light guide 210 should be a mirror face, and the location at which the gate is provided and which deforms the mirror face should be set carefully. For example, the end face, and the external face near the first prism group 121, the second prism group 123, and the center of the Y direction affect the illuminance or the illuminance distribution on the read area 105. Hence, the gate is provided at a location other than such an area.

For example, according to Embodiment 1, the gate is often provided at an area (end) near the end face 168 of the light guide 110 among the external face of the light guide 110. However, this area is approximately parallel with the end face 168 from the LED 151, that is, a portion where incident light at a shallow angle is initially all reflected at first. Accordingly, if the gate is provided at the external face of the end of the light guide 110, in particular, the illuminance or the illuminance distribution on the read area 105 near both ends in the Y direction are affected in some cases.

Figure 14:
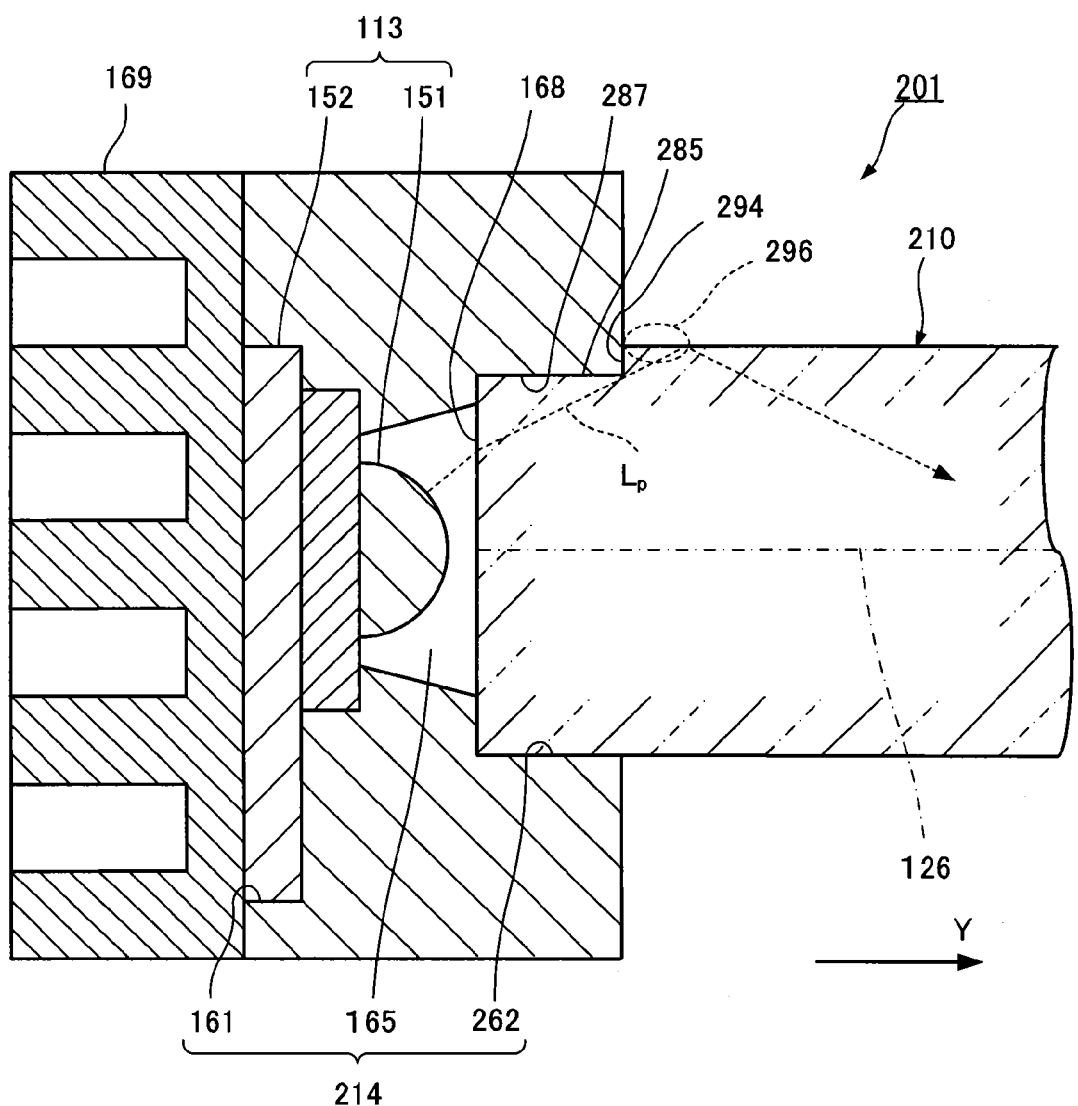
FIG. 14 is a cross-sectional view illustrating the nearby portion of the end of the light guide and the holder thereof according to Embodiment 2 along a lengthwise direction of the light guide.

According to this embodiment, as illustrated in FIG. 14, a connection portion 294 forming a stepped portion to connect the notch 285 with the external face of the light guide 210 abuts or is located near the holder 114. Hence, as illustrated in the figure, the external face of the light guide 210 included in the area encircled by the dashed-line oval 296 becomes a light blocking area that blocks off the propagating light Lp when the end of the light guide 210 is engaged with the holder.

As explained above, according to this embodiment, by providing the gate in the light blocking area, without giving an adverse effect to the illuminance or the illuminance distribution on the read area 105, excellent illuminance and illuminance distribution across the whole read area 105 can be obtained.

The embodiments of the present disclosure and Modified Examples thereof were explained above, but the present disclosure is not limited to the embodiments and Modified Examples, and covers suitable combinations of each embodiment and each Modified Example, and an equivalent technical range thereto.

INDUSTRIAL APPLICABILITY

The irradiation device and the image-reading device according to the present disclosure are applicable to, for example, a copying machine, a scanner, and a device that reads an image of a paper money or valuable stock certificates to determine the authenticity.

This application claims the benefit of priority based on Japanese Patent Application No. 2012-16130 filed on Jan. 30, 2012, including the specification, claims, drawings, and abstract. The entire disclosure of this Japanese Patent Application is herein incorporated in this specification by reference.

REFERENCE SIGNS LIST

100 Image-reading device
101, 201 Irradiation device
102 Reader device
103 Contact glass
104 Document
105 Read area
110, 210 Light guide
111 First reflector
112 Second reflector
113 Light source
114, 214 Holder
115 Plane mirror
121 First prism group
122 First light outgoing area
123 Second prism group
124 Second light outgoing area
136 Plane portion
137 Circumference portion
152 Substrate
161 Light-source attachment
162, 262 Engagement portion
183 Reflector
184 First reflection/scattering substance layer
185 Second reflection/scattering substance layer
285 Notch
286 First abut portion
287 Second abut portion
291 Pushing portion

The invention claimed is:

1. An irradiation device comprising:
a light source that emits light;
a transparent bar-shaped light guide having a circular cross section with radius R and the light source disposed near an end of the light guide;
a first diffusion/reflection portion which is provided so as to extend in a lengthwise direction of the light guide, and which diffuses and reflects light propagating in an interior of the light guide;
a first light outgoing area which is a portion of an outer surface of the light guide extending in the lengthwise direction and located in a reflection direction of the first diffusion/reflection portion, and which emits, as primary light, light reflected by the first diffusion/reflection portion;
a second diffusion/reflection portion which is provided so as to extend in the lengthwise direction of the light guide, and which diffuses and reflects light propagating in the interior of the light guide;
a second light outgoing area which is a portion of the outer surface of the light guide extending in the lengthwise direction and located in a reflection direction of the second diffusion/reflection portion, and which emits, as secondary light, light reflected by the second diffusion/reflection portion;
a plane mirror that reflects the secondary light in a direction overlapping the primary light in a predetermined area;
the second light outgoing area having a curvature of 1/R as viewed in the lengthwise direction of the light guide;
the first light outgoing area that at least partially includes a curved portion having a curvature that is less than 1/R as viewed in the lengthwise direction; and
the primary light having a wider divergence angle than that of the secondary light.

2. The irradiation device according to claim 1, wherein either one of or both of the first diffusion/reflection portion and the second diffusion/reflection portion comprise a prism group provided in an area extending in the lengthwise direction of the light guide.

3. The irradiation device according to claim 2, wherein:
both of the first diffusion/reflection portion and the second diffusion/reflection portion comprise the respective prism groups; and
a number of prisms included in the prism group of the second diffusion/reflection portion is larger than a number of prisms included in the prism group of the first diffusion/reflection portion.

4. The irradiation device according to claim 2, wherein either one of or both of the first diffusion/reflection portion and the second diffusion/reflection portion comprising the prism group further comprise a reflector that covers the prism group.

5. The irradiation device according to claim 4, wherein:
both of the first diffusion/reflection portion and the second diffusion/reflection portion comprise the respective reflectors; and
the reflectors are integral and cover both prism groups.

6. The irradiation device according to claim 2, wherein either one of or both of the first diffusion/reflection portion and the second diffusion/reflection portion comprising the prism group further comprise a reflection/scattering substance layer containing reflection/scattering substances on an outer surface of the prism group.

7. The irradiation device according to claim 6, wherein:
both of the first diffusion/reflection portion and the second diffusion/reflection portion comprise the respective reflection/scattering substance layers; and
an amount of reflection/scattering substances contained in the reflection/scattering substance layer of the second diffusion/reflection portion is larger than an amount of reflection/scattering substances contained in the reflection/scattering substance layer of the first diffusion/reflection portion.

8. The irradiation device according to claim 1, wherein the first diffusion/reflection portion and the second diffusion/reflection portion are each a reflection/scattering substance layer which is provided in an area in the outer surface of the light guide extending in the lengthwise direction and which contains a reflection/scattering substance.

9. The irradiation device according to claim 8, wherein an amount of reflection/scattering substances forming the second diffusion/reflection portion is larger than an amount of reflection/scattering substances forming the first diffusion/reflection portion.

10. An image-reading device comprising:
irradiation device according to claim 1; and
a reader device that receives light reflected from an object irradiated with light from the irradiation device to output image data.

11. The irradiation device according to claim 1, wherein the first light outgoing area includes a plane.

12. The irradiation device according to claim 11, wherein the curved portion includes a first circumference portion arranged at a first edge of the plane and a second circumference portion arranged at a second edge of the plane.

13. An irradiation device comprising:
a light source that emits light;
a transparent bar-shape light guide having the light source disposed near an end of the light guide;
a first diffusion/reflection portion which is provided so as to extend in a lengthwise direction of the light guide, and which diffuses and reflects light propagating in an interior of the light guide;
a first light outgoing area which is a portion of an outer surface of the light guide extending in the lengthwise direction and located in a reflection direction of the first diffusion/reflection portion, and which emits, as primary light, light reflected by the first diffusion/reflection portion;
a second diffusion/reflection portion which is provided so as to extend in the lengthwise direction of the light guide, and which diffuses and reflects light propagating in the interior of the light guide;
a second light outgoing area which is a portion of the outer surface of the light guide extending in the lengthwise direction and located in a reflection direction of the second diffusion/reflection portion, and which emits, as secondary light, light reflected by the second diffusion/reflection portion:
a plane minor that reflects the secondary light in a direction overlapping the primary light in a predetermined area, wherein:
the second light outgoing area has a curvature as viewed in the lengthwise direction of the light guide;
the first light outgoing area at least partially includes a plane or a curved face having a smaller curvature than the second light outgoing area as viewed in the lengthwise direction;
the primary light has a wider divergence angle than that of the secondary light,
the light guide comprises a notch which is formed at a portion of the outer surface other than the first light outgoing area and which includes a plane extending in the lengthwise direction;
the irradiation device further comprises a holder that holds the light source and the light guide; and
the holder comprises:
a light-source attachment to which the light source is attached;
an engagement portion which is in communication with a light-source space through which light emitted by the light source passes, and which includes a hole into which an end of the light guide in the lengthwise direction is fitted, thereby being engaged with the end of the light guide;
a first abut portion which is a surface formed on the engagement portion and which abuts the first light outgoing area;
a second abut portion which is a flat surface formed on the engagement portion and which abuts the notch; and
a pushing portion which pushes the end of the light guide in a direction in which, when the end of the light guide is engaged with the engagement portion, the first light outgoing area is pushed against the first abut portion and the notch is pushed against the second abut portion.

14. The irradiation device according to claim 13, wherein:
the notch comprises a plane that extends in the lengthwise direction at a length in accordance with a length of the light guide in the lengthwise direction engaged with the engagement portion; and
the light guide further comprises a gate for injection molding that is provided near the notch at a center side of the light guide relative to the notch in the lengthwise direction.

15. An irradiation device comprising:
a light source that emits light;
a transparent bar-shaped light guide having a circular cross section with radius R and the light source disposed near an end of the light guide;
a first diffusion/reflection portion which is provided so as to extend in a lengthwise direction of the light guide, and which diffuses and reflects light propagating in an interior of the light guide;
a first light outgoing area which is a portion of an outer surface of the light guide extending in the lengthwise direction and located in a reflection direction of the first diffusion/reflection portion, and which emits, as primary light, light reflected by the first diffusion/reflection portion;
a second diffusion/reflection portion which is provided so as to extend in the lengthwise direction of the light guide, and which diffuses and reflects light propagating in the interior of the light guide;
a second light outgoing area which is a portion of the outer surface of the light guide extending in the lengthwise direction and located in a reflection direction of the second diffusion/reflection portion, and which emits, as secondary light, light reflected by the second diffusion/reflection portion;
a plane mirror that reflects the secondary light in a direction overlapping the primary light in a predetermined area;
the second light outgoing area having a curvature of 1/R as viewed in the lengthwise direction of the light guide;
the first light outgoing area that includes a plane portion as viewed in the lengthwise direction; and
the primary light having a wider divergence angle than that of the secondary light.

* * * * *